United States Patent
Adler et al.

(10) Patent No.: US 7,603,317 B2
(45) Date of Patent: Oct. 13, 2009

(54) USING A PRIVACY AGREEMENT FRAMEWORK TO IMPROVE HANDLING OF PERSONALLY IDENTIFIABLE INFORMATION

(75) Inventors: Steven B. Adler, Port Washington, NY (US); Nigel Howard Julian Brown, Richmond Hill (CA); Arthur M. Gilbert, Bethel, CT (US); Charles Campbell Palmer, Goldens Bridge, NY (US); Michael Schnyder, Bern (CH); Michael Waidner, Au (CH)

(73) Assignee: International Business Machines Corporation, Armonk, NY (US)

( * ) Notice: Subject to any disclaimer, the term of this patent is extended or adjusted under 35 U.S.C. 154(b) by 1568 days.

(21) Appl. No.: 09/884,296

(22) Filed: Jun. 19, 2001

(65) Prior Publication Data

US 2003/0014418 A1    Jan. 16, 2003

(51) Int. Cl.
    *G06Q 99/00*    (2006.01)
(52) U.S. Cl. .............................. 705/51; 705/57; 726/6
(58) Field of Classification Search .................. 705/51; 707/1–10
    See application file for complete search history.

(56) References Cited

U.S. PATENT DOCUMENTS

| | | | |
|---|---|---|---|
| 5,109,337 A | | 4/1992 | Ferriter et al. |
| 5,614,927 A | | 3/1997 | Gifford et al. |
| 5,689,565 A | * | 11/1997 | Spies et al. ................. 713/189 |
| 5,787,427 A | | 7/1998 | Benantar et al. |
| 5,797,128 A | | 8/1998 | Birnbaum |
| 5,892,900 A | * | 4/1999 | Ginter et al. .................. 726/26 |
| 6,044,349 A | | 3/2000 | Tolopka et al. |
| 6,112,181 A | | 8/2000 | Shear et al. |
| 6,138,119 A | | 10/2000 | Hall et al. |
| 6,223,094 B1 | | 4/2001 | Muehleck et al. |
| 6,636,858 B1 | * | 10/2003 | Coffey et al. ............... 707/100 |

FOREIGN PATENT DOCUMENTS

EP    1081916 A2  *  7/2000

OTHER PUBLICATIONS

Kroenke, David M. "Database Processing: Fundamentals, Design, and Implementation"(c)1999; 7th ed. Prentice-Hall, Inc. New Jersey. pp. 49-68.*

* cited by examiner

*Primary Examiner*—Andrew J. Fischer
*Assistant Examiner*—Chrystina Zelaskiewicz
(74) *Attorney, Agent, or Firm*—Stephen J. Walder, Jr.; William H. Steinberg (57) ABSTRACT

The invention entails identifying the parties involved in a process of handling personally identifiable information; identifying the data involved in said process; classifying the data; expressing each relationship between each pair of said parties in terms of a privacy agreement; and representing the parties, data, and privacy agreements graphically in one or more privacy agreement relationship diagrams. The invention has the advantage of identifying opportunities to reduce privacy-related risks, including identifying unnecessary exchanges of data, for possible elimination, and identifying opportunities to transform data into a less sensitive form. Privacy agreements are based on a limited set of privacy-related actions: access, disclose, release, notify, utilize, update, withdrawConsent, giveConsent, delete, anonymize, depersonalize, and repersonalize. One aspect of the present invention is a method for improving the handling of personally identifiable information. Another aspect of the present invention is a system for executing the method of the present invention. A third aspect of the present invention is as a set of instructions on a computer-usable medium, or resident in a computer system, for executing the method of the present invention.

6 Claims, 5 Drawing Sheets

Empty Form: = Form Fields + Privacy Policy
Filled Form: = Empty Form + Collected Data

USING A PRIVACY AGREEMENT FRAMEWORK TO IMPROVE HANDLING OF PERSONALLY IDENTIFIABLE INFORMATION

CROSS-REFERENCES TO RELATED APPLICATIONS, AND COPYRIGHT NOTICE

The present application is related to co-pending applications entitled Using an Object Model to Improve Handling of Personally Identifiable Information, Ser. No. 09/884,311, and Using a Rules Model to Improve Handling of Personally Identifiable Information, Ser. No. 09/884,153, filed on even date herewith, assigned to the assignee of the present application, and herein incorporated by reference. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to information handling, and more particularly to methods and systems to improve handling of personally identifiable information.

BACKGROUND OF THE INVENTION

Many approaches to information handling have been proposed in the past. Regarding approaches to storing data in a way that is useful for some process, examples include U.S. Pat. No. 5,109,337 (Ferriter, et al., Apr. 28, 1992), which relates to a manufacturing effort or hardware design. It discloses a "conceptual design tool method" that involves storing manufacturing information in a database, and generating a parts list. Another example is U.S. Pat. No. 6,223,094 B1 (Muehleck et al., Apr. 24, 2001), which relates to manufacturing (of vehicles, for example) and discloses a data structure, with multiple layers, for products, components, and manufacturing processes.

Regarding approaches to storing data in a way that allows control over access and use of the data (e.g. access is allowed or not allowed, according to a rule), examples include U.S. Pat. No. 6,112,181 (Shear et al., Aug. 29, 2000), which relates to the transmission ("narrowcasting") of selected digital information, associated with "rights management information" or rules and controls. The "rights management information" mainly concerns commercial use: e.g. payment, membership cards, creation of an audit record, creation of a derivative work. Another example is U.S. Pat. No. 6,138,119 (Hall et al., Oct. 24, 2000), which discloses a descriptive data structure, and data packaged with rules in a secure container.

However, the above-mentioned examples address substantially different problems, and thus are significantly different from the present invention.

In light of laws and public concern regarding privacy, there is a need for systems and methods to improve the handling of personally identifiable information.

SUMMARY OF THE INVENTION

The present invention is a system and method for improving the handling of personally identifiable information. The invention entails identifying the parties involved in a process of handling personally identifiable information; identifying the data involved in said process; classifying the data; expressing each relationship between each pair of said parties in terms of a privacy agreement; and representing the parties, data, and privacy agreements graphically in one or more privacy agreement relationship diagrams.

For example, the invention has the advantage of identifying opportunities to reduce privacy-related risks, including identifying unnecessary exchanges of data, for possible elimination, and identifying opportunities to transform data into a less sensitive form.

The present invention uses terminology from International Business Machine Corporation's Enterprise Privacy Architecture (EPA). This architecture describes a model and a terminology for describing and handling personally identifiable information (PII). The present invention may apply to any process of handling PII by any person or organization, including those engaged in commerce, medicine, science, education, government, law enforcement, insurance, and finance. The concepts of an empty form for gathering data under a specified policy, and a filled form for representing the gathered data along with the policy, are used when describing data actions. The concept of the empty form may be implemented by various techniques for gathering data and specifying policy, such as printed policy statements and email or phone contact. The concept of the filled form may be implemented in any way of capturing input data and storing it, associated with the policy. The main actors in EPA are a data subject (i.e. the person who is described by the PII) and one or more data users (e.g. different organizations or individuals). The privacy agreements are based on a limited set of privacy-related actions: access, disclose, release, notify, utilize, update, withdrawConsent, giveConsent, delete, anonymize, depersonalize, and repersonalize.

BRIEF DESCRIPTION OF THE DRAWINGS

A better understanding of the present invention can be obtained when the following detailed description is considered in conjunction with the following drawings. The use of the same reference symbols in different drawings indicates similar or identical items.

FIG. 6 is a class diagram illustrating objects to be used in a process for improving the handling of Personally Identifiable Information, according to the teachings of the present invention. In particular, FIG. 6 shows classes representing active entities like human beings or legal entities.

DETAILED DESCRIPTION

The examples that follow involve the use of computers and a network. The present invention is not limited as to the type of computer on which it runs, and not limited as to the type of network used. Various implementation methods may be used for the present invention. The examples that follow involve information that is communicated between computers; this information could be in hypertext markup language (HTML), or extensible markup language (XML), or some other language or protocol could be used.

XML provides a way of containing and managing information that is designed to handle data exchange among various data systems. Thus it is well-suited to implementation of the present invention. Reference is made to the book by Elliotte Rusty Harold and W. Scott Means, *XML in a Nutshell* (O'Reilly & Associates, 2001). As a general rule XML messages use "attributes" to contain information about data, and "elements" to contain the actual data.

The following are definitions of terms used in the description of the present invention and in the claims:

Attribute: The term that is used to describe the passive aspects of classes/objects in Object Oriented Design/Programming. It may be seen as the equivalent of a data field in a database record (which is called attribute since the introduction of relational databases). An attribute can take values of a certain type (like integer number, string etc.).

Class: In Object Oriented Design/Programming, the term class is used to describe the type of an object. It is defined by its properties (mainly the attributes and methods) and the action of actually creating an object in concrete cases is called instantiation.

"Computer-usable medium" means any carrier wave, signal or transmission facility for communication with computers, and any kind of computer memory, such as floppy disks, hard disks, Random Access Memory (RAM), Read Only Memory (ROM), CD-ROM, flash ROM, non-volatile ROM, and non-volatile memory.

Data Subject: The party (individual or under some legislation also legal entity) whose data is being collected and processed and whose privacy we are dealing with Data User: The party who is processing data (processing in the sense as defined by the European Data Protection Directive covering all steps from collection to deletion.)

EPA: Enterprise Privacy Architecture.

EU Data Protection Directive: Directive 95/46/EC of the European Parliament and of the Council of 24 Oct. 1995 on the protection of individuals with regard to the processing of personal data and on the free movement of such data.

Guardian: The party who is the legal representative of a Data Subject, usually a minor or mentally handicapped person.

Model: An abstracted representation of some subset of reality. In the present context the subset is created by selecting the aspects of reality that are relevant to privacy.

Object: This term is used for the "living" instantiation of a class.

Personally Identifiable Information (PII) is defined as "Any information relating to an identified or identifiable natural person ('data subject')." An identifiable person is one who can be "identified, directly or indirectly, in particular by reference to an identification number or to one or more factors specific to his physical, physiological, mental, economic, cultural or social category." (From the EU Data Directive.)

"Storing" data or information, using a computer, means placing the data or information, for any length of time, in any kind of computer memory, such as floppy disks, hard disks, Random Access Memory (RAM), Read Only Memory (ROM), CD-ROM, flash ROM, non-volatile ROM, and non-volatile memory.

Figure 1:
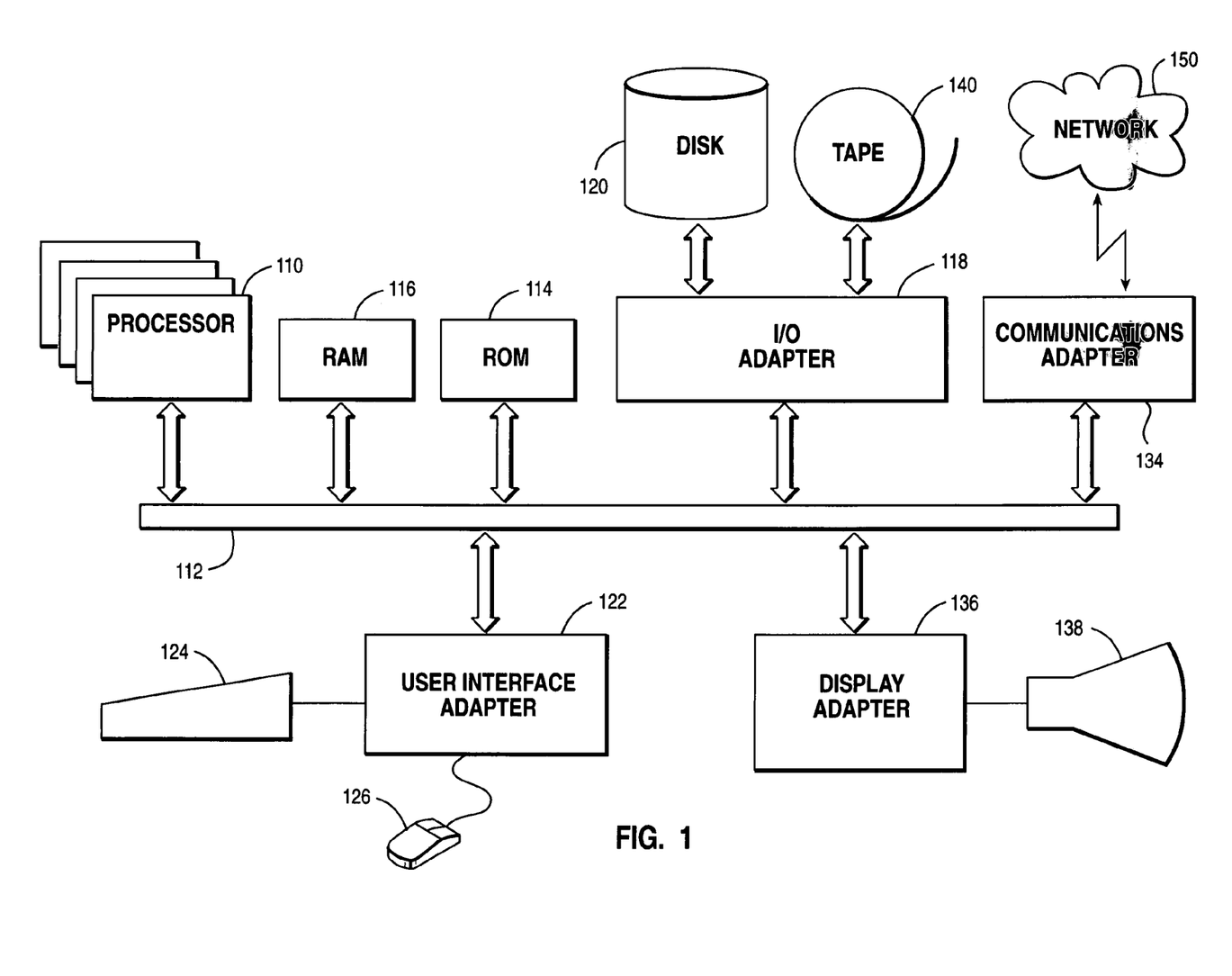
FIG. 1 illustrates a simplified example of an information handling system that may be used to practice the present invention.

FIG. 1 illustrates a simplified example of an information handling system that may be used to practice the present invention. The invention may be implemented on a variety of hardware platforms, including personal computers, workstations, servers, and embedded systems. The computer system of FIG. 1 has at least one processor 110. Processor 110 is interconnected via system bus 112 to random access memory (RAM) 116, read only memory (ROM) 114, and input/output (I/O) adapter 118 for connecting peripheral devices such as disk unit 120 and tape drive 140 to bus 112, user interface adapter 122 for connecting keyboard 124, mouse 126 or other user interface devices to bus 112, communication adapter 134 for connecting the information handling system to a data processing network 150, and display adapter 136 for connecting bus 112 to display device 138. Communication adapter 134 may link the system depicted in FIG. 1 with hundreds or even thousands of similar systems, or other devices, such as remote printers, remote servers, or remote storage units. The system depicted in FIG. 1 may be linked to both local area networks (sometimes referred to as Intranets) and wide area networks, such as the Internet.

While the computer system described in FIG. 1 is capable of executing the processes described herein, this computer system is simply one example of a computer system. Those skilled in the art will appreciate that many other computer system designs are capable of performing the processes described herein.

Figure 2:
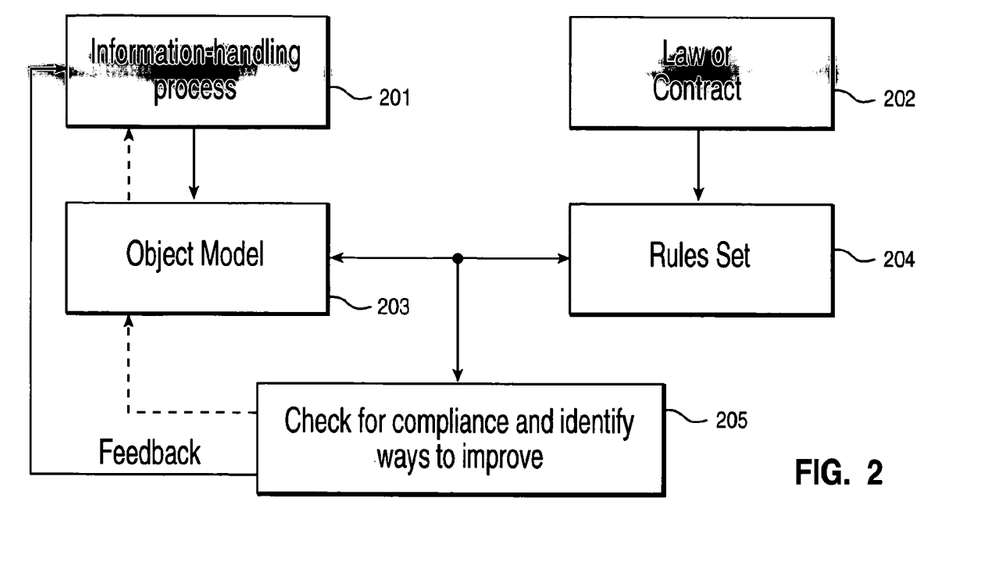
FIG. 2 is a diagram with a feedback loop illustrating an example of a method for improving the handling of Personally Identifiable Information, according to the teachings of the present invention.

FIG. 2 is a diagram illustrating an example of a method for improving the handling of Personally Identifiable Information, according to the teachings of the present invention. On one hand is an information-handling process, at block 201, (a business process for example) which is modeled by an object model at block 203. On the other hand exist laws or contracts, at block 202, from which a rules set at block 204 is derived. At block 205, object model 203 and rules set 204 are compared; actions taken at block 205 are checking for compliance, and identifying ways to improve the information-handling process. The result is feedback to the information-handling process, at block 201. There may be feedback to the object model at block 203 for adaptation purposes.

Figure 3:
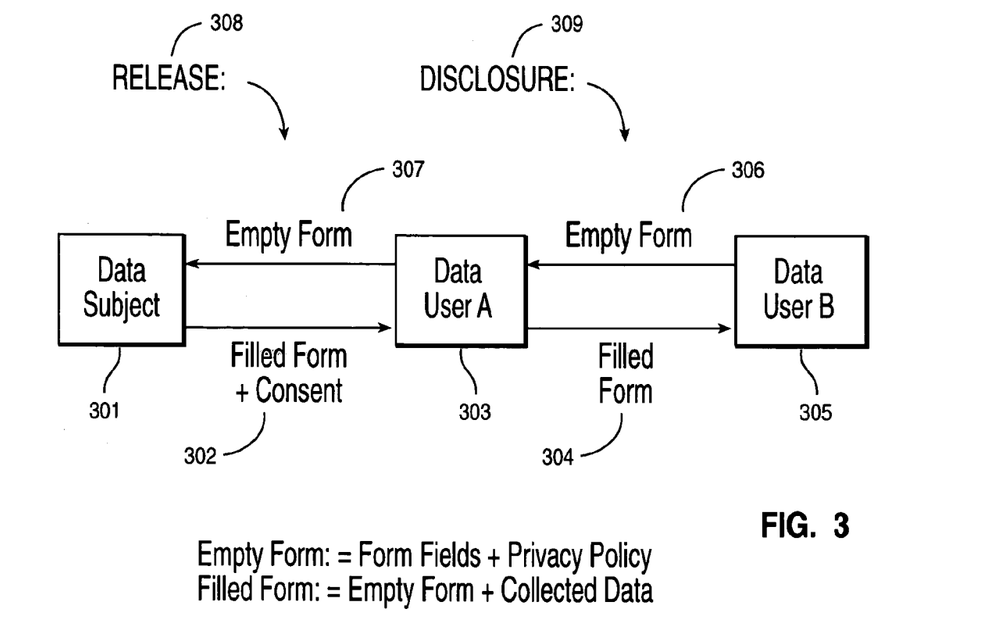
FIG. 3 is a diagram illustrating an example of a method for handling Personally Identifiable Information, along with key terms and concepts, such as an empty form and a filled form, according to the teachings of the present invention.

FIG. 3 is a diagram illustrating an example of a method for handling Personally Identifiable Information, along with key terms and concepts, according to the teachings of the present invention. The concepts of an empty form, 306 or 307, for gathering data under a specified policy, and a filled form 304 for representing the gathered data along with the policy, are used when describing data actions. The concept of the empty form, 306 or 307, may be implemented by various techniques for gathering data and specifying policy, such as printed policy statements and email or phone contact. The concept of the filled form 304 may be implemented in any way of capturing input data and storing it, associated with the policy. The main actors in EPA are a data subject 301 (i.e. the person who is described by the PII) and one or more data users, 303 or 304 (eq. different organizations or individuals). Initially, a data user 303 asks a data subject 301 to release data, 308. This done by first sending an empty form 307 that contains fields to fill in, as well as a privacy policy. Then the data subject 301 returns a filled form 302 that contains his or her PII along with the associated policy. PII always is associated with policy. Later, a data user 303 may want to send the data to another data user 305. This is called disclosure, 309. A data user 305 sends an empty form 306 including a policy. The data user 303 checks to see whether a disclosure to this data user 305 under the given policy is allowed. If so, the data is filled into the empty form 306 and the resulting filled form 304 is sent to the other data user 305. A privacy policy contains a set of rules that are specific to a data user such as 303 or 305. Each rule allows a privacy action on personal data within specified constraints. EPA defines twelve privacy actions. The privacy actions described by the policy rules define the purpose for which data can be utilized and disclosed. Constraints may require consent from the data subject 301 before the action is allowed, or rules may allow consent to be withdrawn. This supports opt-in or opt-out choices for the data subject 301.

Figure 4:
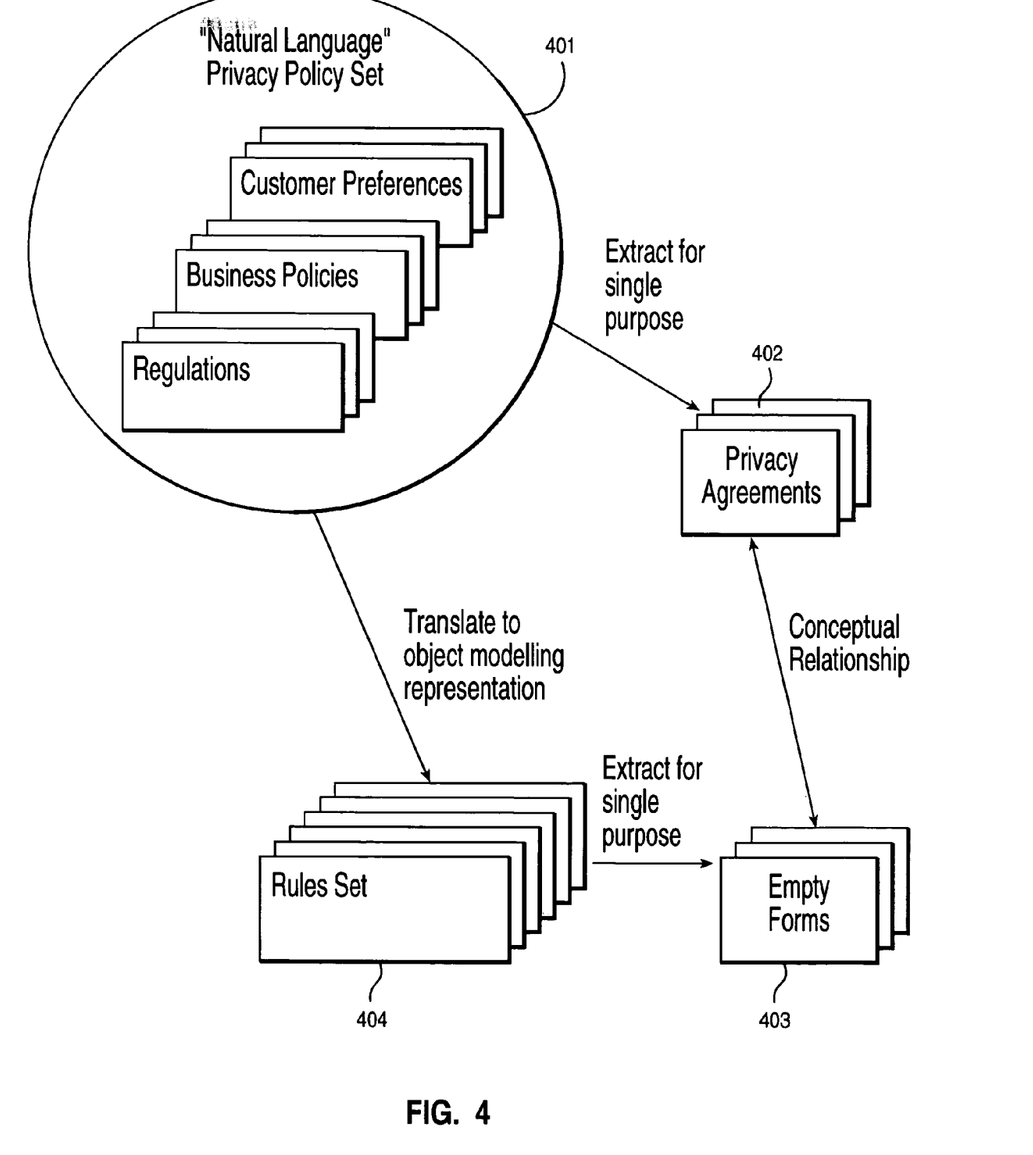
FIG. 4 is a diagram illustrating an example of a method for improving the handling of Personally Identifiable Information, along with key terms and concepts such as an empty form and a privacy agreement, according to the teachings of the present invention.

FIG. 4 is a diagram illustrating an example of a method for improving the handling of Personally Identifiable Information, along with key terms and concepts, according to the teachings of the present invention. The present invention provides an object called an Empty Form, shown at 403, that describes what is allowed to happen to data. The present invention provides an equivalent entity called a privacy agreement, shown at 402, to capture real life privacy relationships. Privacy agreements 402 are derived from natural language privacy policy set 401, which may include regulations, business policies, and customer preferences, for example. Rules set 404 also is derived from natural language privacy policy set 401, through translation to object modeling representation. Empty Forms 403 are derived from rules set 404. A privacy agreement 402 is a subset of the natural language privacy policy set 401 that constitute an organization's privacy policy; the subset is specific to a particular situation or purpose, just as an Empty Form, shown at 403, is a subset of the rules set 404 specific to a particular situation or purpose. The difference is that the privacy agreement 402 is specific to the two parties involved, whereas the Empty Form, shown at 403, is specific to the data. Rules set 404, Empty Forms 403, and privacy agreements 402 are useful for analyzing and improving the handling of Personally Identifiable Information.

Figure 5:
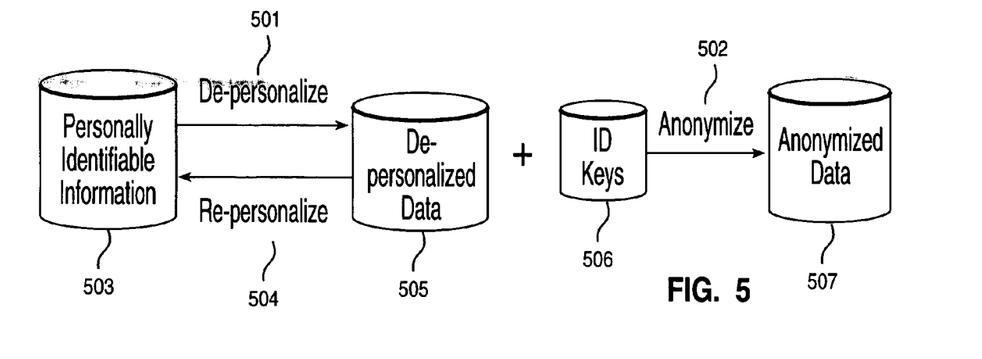
FIG. 5 is a diagram illustrating an example of a method for handling Personally Identifiable Information, along with key terms and concepts, according to the teachings of the present invention; the mechanism for transforming data between three main categories are shown in FIG. 5.

FIG. 5 is a diagram illustrating an example of a method for handling Personally Identifiable Information, along with key terms and concepts, according to the teachings of the present invention. The twelve privacy-relevant actions, according to the teachings of the present invention, describe the actions that can be taken on the different categories of data, and three of them actually provide the mechanism for transforming data between the three main categories as shown in FIG. 5. Personally Identifiable Information (PII) 503 is defined as "Any information relating to an identified or identifiable natural person ('data subject')." An identifiable person is one who can be "identified, directly or indirectly, in particular by reference to an identification number or to one or more factors specific to his physical, physiological, mental, economic, cultural or social category." (From the EU Data Directive.) PII 503 is any data, or combination of data, that can be used to identify a person. In an online bookstore, for example, any record that contains the subscriber's full name or exact address is PII 503.

De-Personalized Data 505 is PII where the link to the data subject is not visible, and cannot be established without knowing some additional information 506 (like the correspondence between a pseudonym and the real name and address of the data subject). Data can be already collected in depersonalized form (e.g., under a pseudonym), or generated from PII 503 by detaching all identifying elements 506, on a temporary basis. This can facilitate analysis, reporting and other uses of information that do not require the ability to specifically identify the data subject. Knowing the additional linking information 506, depersonalized data 505 can be reconstituted into a PII 503 form.

In an online bookstore, for example, an order number together with the list of books in that order would be depersonalized data 505, while this data together with the information on which subscriber created that order would be PII 503.

Removing all identifying elements, by process anonymize 502, transforms PII 503 and depersonalized data 505 into anonymized data 507. This type of information is often aggregated for reporting purposes. Since it can still provide a transaction level view, an enterprise is able to plan and understand their customer set and operations effectively while ensuring a high level of protection for the data subject.

In an online bookstore, for example, this would be data that can be held by the marketing department to identify the top book sold in a particular city. The Marketing Department would not need the actual name of the subscribers who bought that book, just that "subscribers" bought that book in, say, Chicago. The PII 503 would have to be cleansed of all identifiers by another department (e.g. Billing Department) before the Marketing Department would gain access to it.

In addition to this categorization of data, the EPA Data Model provides the following sub-categories for various types of contextual data that constitute PII 503 when connected with a name (this is consistent with the framework introduced by P3P, Platform for Privacy Preferences, an industry consortium working on automated communication of privacy preferences).

Roles & Responsibilities
Physical Contact
Online Contact
Non-Governmental Unique Identifiers
Government-Issued Identifiers
Purchase and Transactional Information
Financial Information
Computer Information
Navigation and Click-stream Data
Interactive Data
Demographic and Socioeconomic Data
Organizational Characteristics
Communication Content
State Management Mechanisms
Political Information
Health Information
Preference Data
Location Data
Other These sub-categories have been defined in detail and provide a basis for data de-personalization and provide additional useful terminology that can be used in designing specific EPA objects (e.g., privacy agreements) in a standardized and reusable way.

Figure 6:
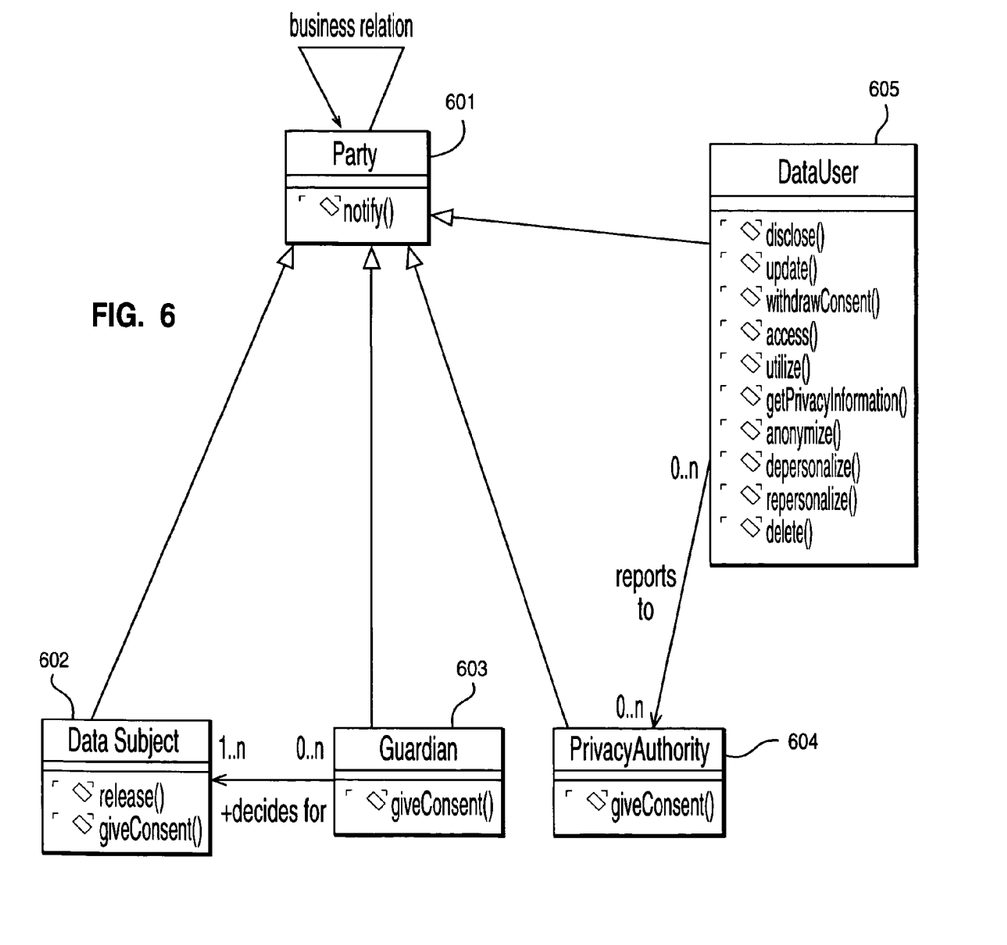

FIG. 6 is a class diagram illustrating objects to be used in a process for improving the handling of Personally Identifiable Information, according to the teachings of the present invention. FIG. 6 uses Unified Modeling Language (UML), the de facto standard in Business Object Modeling. In particular, FIG. 6 shows classes representing active entities like human beings or legal entities. Inheritance relationships are shown by lines that have a triangle on the end by the parent or superclass. Regarding FIG. 6, the term "method" has a special meaning. The term "method" is used for active aspects or behaviors of classes or objects in Object-Oriented Design or Programming. Usually a method is looked at as a service that is being provided by the object in question and requested by another object sending a message to the object.

The twelve privacy-relevant actions by active entities are shown as services being provided by the objects in FIG. 6.

Notify( ): This method is present at the Party 601 level, that is, all subclasses of Party 601 are capable of performing the corresponding action. The method executes in the object receiving notification (and could therefore be called "receive_notification"). In the model, the method is triggered (or its execution is requested) by the DataUser 605 whereas the method itself executes in the object receiving notification (DataSubject 602 or PrivacyAuthority 604). Consider the following examples; execution by DataSubject 602: Many laws obligate physicians to report cases of infectious diseases (e.g. tuberculosis) to health authorities. Now, for reasons of transparency and in the interest of a good relationship between patient and physician, the doctor will let his patient know what data is being transmitted to whom and for what purposes (he will notify the patient about this fact). The notify( ) method will be executed by the patient.

Consider execution by Guardian 603: According to COPPA (Children's Online Privacy Protection Act) the DataUser who is running a website targeting children must make notify the parents about the fact that he is collecting information from their child and about the purposes of processing. The notify( ) method is executed by the Guardian 603 and triggered by DataUser 605.

Consider execution by PrivacyAuthority 604: The Swiss Data Protection Law (article 6§2) asks the DataUser to notify the Data Protection Commissioner about certain cases of transborder communication of personal information. The notify( ) method is executed by the PrivacyAuthority 604.

Consider execution by DataUser 605: When a DataUser 605 finds out that some personal information he processes is erroneous, he may find it appropriate to notify( ) the source from where he collected this information.

GiveConsent( ): This method is present in the classes DataSubject 602, Guardian 603 and PrivacyAuthority 604. In the model, its execution is requested by a DataUser 605. Executing this method means expressing consent for a specified use of a certain set of personal information. Consider the following examples execution by DataSubject 602: The customer (DataSubject) of a shop (DataUser) agrees that his address may be used for marketing purposes by this data user.

Consider execution by Guardian 603: According to COPPA (Children's Online Privacy Protection Act) the DataUser who is running a website targeting children must make an effort to obtain parental consent for the collection, use and disclosure of child's personal information. If this effort is successful, the Guardian 603 can giveConsent( ) for the proposed purpose.

Consider execution by PrivacyAuthority 604: In some countries PrivacyAuthority 604 has the power to authorize the processing of personal information. One might argue that this is not exactly an act of giving consent, but basically what the PrivacyAuthority 604 does in this case, is to substitute the consent of the DataSubject which is why the giveConsent( ) is present in the PrivacyAuthority 604 class.

Release( ): This method is specific to the DataSubject 602 in the sense that only objects of this class contain it. The execution of the method may be triggered by the DataSubject 602's own will or by a request from a DataUser 605. The execution of the method is the DataSubject 602's action of releasing his personal information to a Data User. Consider the following example: When applying for car insurance DataSubject 602 fills out a form and sends it to the insurance company (DataUser 605) and thereby releases personal information.

Disclose( ): This method is only present in objects of class DataUser 605. It is triggered by the request coming from another DataUser 605 and its execution is the action of communicating data to that other DataUser 605. Note that the method can stand for a communication across enterprise boundaries as well as for communications internal to an enterprise. Consider the following examples: A physician reports cases of tuberculosis to the public health authorities thereby disclosing patients' information.

An HR employee is being asked by a clerk of the accounting department to communicate to him all information he has on a certain other employee. This example shows a) that it makes sense to have rules concerning disclosures internal to an enterprise and b) that it makes sense to have an enterprise modeled as more than one single DataUser 605.

Update( ): This method is present in the DataUser 605 class and corresponds to the action of modifying data. Consider the following example: The owner of a shop (DataUser) updates a customer's (DataSubject) address. Note that this update can take place upon request by the DataSubject 602 or by the DataUser 605 autonomously.

WithdrawConsent( ): When the DataSubject withdraws his consent, e.g. with respect to a certain purpose of processing (cf. example below), then this method is executed by the DataUser 605 (upon request from the DataSubject 602). The method may, however, also be triggered by another DataUser 605 who has the obligation to propagate the consent withdrawal. The counter-intuitive name of this method deserves a comment: In the real world, it is obvious that the withdrawal of consent is an action that the DataSubject is executing. It does, however, not make a great deal of sense to introduce this method into the model (because it is never triggered by another method, but always by the individual's own free will). On the other hand, the naming follows a pattern frequently encountered in system design: If an object performs a method, which again triggers a method of another object, then they frequently are given the same name. This does not lead to misunderstandings, because the full names of methods are always composed like this: <objectname>.<methodname>. Consider the following example: When a DataSubject 602 asks a DataUser 605 to stop sending her marketing material (DataSubject 602 opts out), the latter modifies his rules with respect to the DataSubject 602 in question.

Access( ): This method is the DataUser 605's action of granting the DataSubject 602 access to her information. The method will always be invoked by the DataSubject 602 (or Guardian 603). Consider the following example: After a customer (DataSubject) has asked and proved her identity, the online bookstore (DataUser) grants the customer access to her information.

Utilize( ): This unary method is present in the DataUser 605 class and corresponds to the action of using a certain piece of information the DataUser 605 is holding. The qualifier "unary" means that this action—as opposed to the previously mentioned ones—does not imply the participation of two parties, because it is executed by the same Party that has triggered the execution. Note that on their own, the words utilize or use do not have a precise meaning in this context. In the real world the central and most meaningful element of a utilize action is its purpose (cf. the example given below). In the real world, the execution of this method is requested implicitly by the DataUser himself (and there may be cases where it is requested explicitly by legislative texts). Consider the following example: It may be acceptable that an enterprise installs video cameras at particular places in order to guarantee their employees' safety; the material gathered with this equipment may therefore be used with this purpose in mind, but not for other purposes (like surveillance of employees' behavior).

Anonymize( ): The method is only contained in objects of class DataUser 605. It is the first special case of the utilize action which is modeled separately because of its special relevance in the privacy context. Its execution is the action of taking a set of personal information and stripping off all the elements that would possibly allow the information to be related to specific DataSubject 602's. Consider the following example, of records containing the fields name, address, as well as age in years, and blood pressure; if the name and address fields are stripped off, the set of age and blood pressure may be called non personally identifiable information.

Depersonalize( ): This method is also specific to the DataUser 605 class and the second special case of the utilize action which is modeled separately because of its special relevance in the privacy context. It consists of taking a set of personal information and stripping off enough in order to prevent the linkage to individual DataSubject 602's. As opposed to the anonymize action, this action is reversible. That is, there is a means to re-personalize the information. Consider the following example: In a cancer register database, identifying information is replaced by a number or code. At the same time, a table of correspondence between the codes and the identifying information is set up and stored in a secured place. This table can later be used in order to re-personalize the information (which is necessary if one wants to update the register with new information).

Repersonalize( ): This is another method that only the DataUser 605 can perform. It is the third special case of the utilize action which is modeled separately because of its special relevance in the privacy context. The content of the method is the action of re-introducing identifying information to a set of depersonalized information. Consider the example given above for depersonalize( ).

GetPrivacyInformation( ): This method is a privacy relevant action specific to the Canadian regulatory context and might not be needed under other legislation. This legislation asks the DataUser to make available his data handling policies and practices including the identity of the responsible person for privacy in the enterprise. The method is specific to DataUser 605 class objects and is usually requested by the Data Subject 602.

Figure 7:
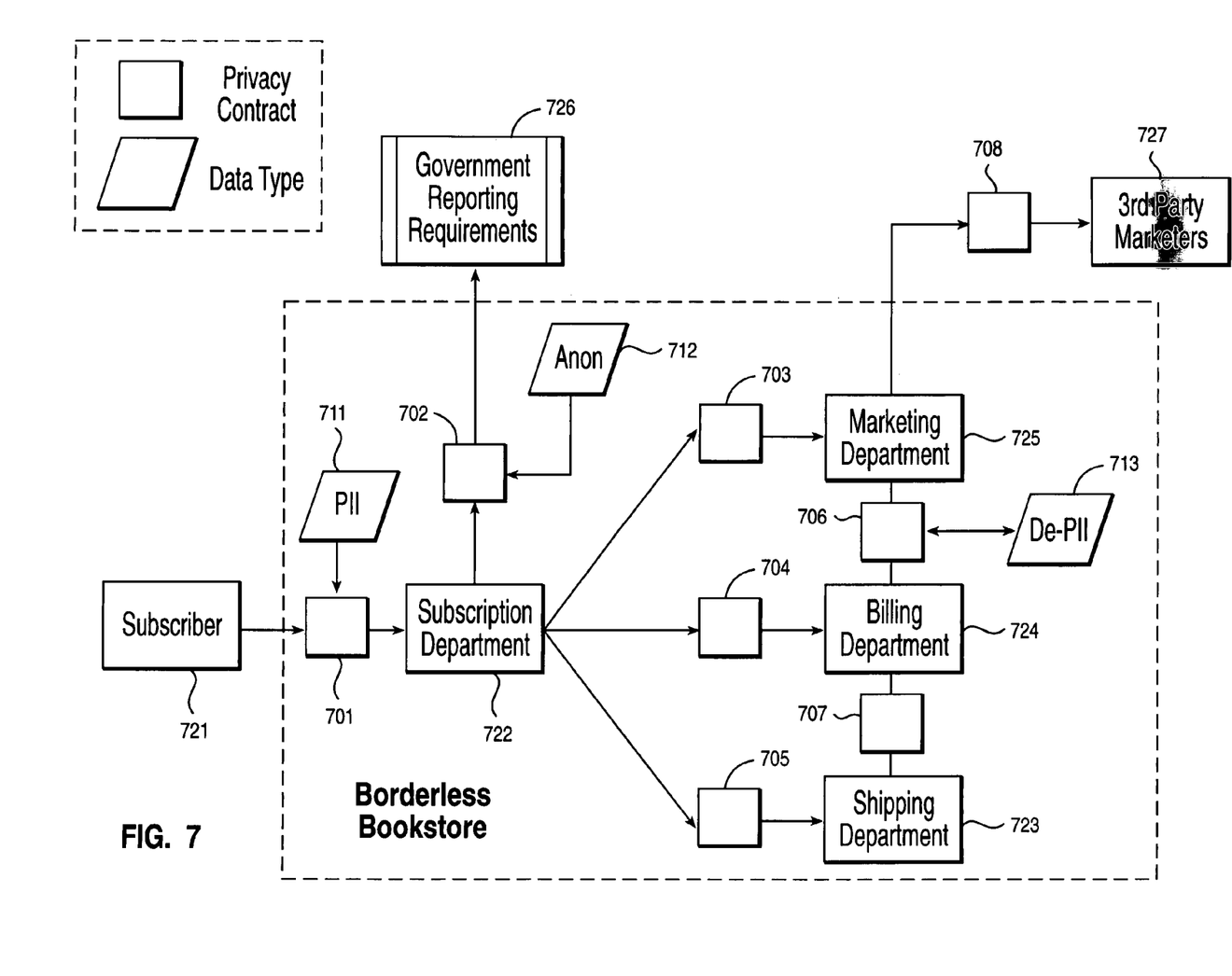
FIG. 7 is an example of a privacy agreement relationship diagram.

Referring now to FIG. 7, this diagram is an example of a privacy agreement relationship diagram. The privacy agreement has the following characteristics:

It is expressed in terms of the privacy relevant actions defined in the EPA Object Model (see description of FIG. 6).

The rules applied to these actions are derived from the organization's overall privacy policy.

It is specific to a single purpose relating to the exchange of personal information between two parties (so if two parties exchange personal information for more than one purpose they have more than one privacy agreement).

The agreement can be between any two parties whether they be a natural persons, departments, computer systems or organizations.

For example, a privacy agreement between the Book of the Month Club Subscriber and the Borderless Books Subscription Department may look like the table below:

| | |
|---|---|
| Agreement Identifier | Book of the Month Subscription Processing |
| Name of Party A | Subscriber |
| Name of Party B | Subscription Department of Borderless Books |
| Purpose of relationship between A & B | Processing of "Book of the Month" Subscription Request |
| Nature of data relationship | Subscriber provides required PII to process subscription order |
| Rules for Party A in current context: | |
| Release | PII required to fill subscription subject to provisions of BLS Privacy Statement |
| Give Consent | Consent to use for subscription is implied, "opt-in" consent for other marketing is explicit |
| Withdraw Consent | Ability to withdraw consent through Subscriptions Dept (cancel sub/change opt-in choice) |
| Access | Ability to access subscription information through Subscriptions Dept |
| Update | Ability to correct subscription information through Subscriptions Dept (ex: address) |
| Utilize | Not applicable in this context-is a disclosing data source |
| Disclose | Not applicable in this context-is a disclosing data source |
| Notify | Not applicable in this context-is a disclosing data source |
| De/Re-personalize/Anonymize | Not applicable in this context |
| Delete | Not applicable in this context-is a disclosing data source |
| Security Requirements | Not applicable in this context-is a disclosing data source |
| Rules for Party B in current context: | |
| Release | Must request only amount of information required to fulfill subscription |
| Give Consent | Requests through subscription form and "opt-in" field |
| Withdraw Consent | Must process request to cancel subscription or change opt-in choice |
| Access | Must process request to access subscription information |
| Update | Must process request to correct subscription information (ex: address) |
| Utilize | Can utilize PII in accordance with Privacy Statement and "opt-in" provision |
| Disclose | May disclosure PII to Marketing if "opt-in" is selected |
| Notify | Must notify subscriber if change in meaning of "opt-in" |
| De/Re-personalize/Anonymize | May anonymize for reporting Statistics to Government Agency |
| Delete | Must delete subscription or "opt-in" selection if Withdraw Consent is requested |
| Security Requirements | Provide appropriate information security for all data (PII, Credit Card information) |

A Privacy Agreement Framework is built by also incorporating the Party objects from the Object Model (see FIG. 6) and the data type from the Data Model (see FIG. 5). Specifically, as shown in FIG. 7, the parties are identified (e.g. the book of the month club subscriber 721; the Subscription Department 722, Shipping Department 723, Billing Department 724, and Marketing Department 725 of Borderless Books, an online bookstore). The data is identified and classified (e.g. subscription data 711 are PII; purchasing patterns (not shown) are PII) and the privacy contracts or privacy agreements 710, 702, 703, 704, 705, 706, 707, and 708 are built between each pair of parties for each different purpose. These elements are then represented graphically in one or more privacy agreement relationship diagrams such as FIG. 7. The production of privacy agreement relationship diagrams may be computerized. This may involve using word processing and drawing software, for example. On the other hand, production may be more highly computerized, and may involve a consultant's computer interacting with a client organization's computer via a network, for example.

Using this Privacy Agreement Framework, any business process can be mapped to the privacy rules that should govern the behavior of each pair of parties. The value to organizations is a clear pictorial representation, such as FIG. 7, of privacy-implicated relationships in the terms that organizations understand best—their own business entities and processes.

This pictorial representation such as FIG. 7 has additional value in that it facilitates identifying opportunities to reduce privacy-related risks involved in business processes. This may be realized by eliminating unnecessary data exchanges or by transforming data to a less sensitive form (see FIG. 5). Examples of a less sensitive form are de-personalized data 713 and anonymized data 712.

One of the possible implementations of the invention is an application, namely a set of instructions (program code) in a code module which may, for example, be resident in the random access memory of a computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer-usable medium having computer-executable instructions for use in a computer. In addition, although the various methods described are conveniently implemented in a general-purpose computer selectively activated or reconfigured by software, one of ordinary skill in the art would also recognize that such methods may be carried out in hardware, in firmware, or in more specialized apparatus constructed to perform the required method steps.

While the invention has been shown and described with reference to particular embodiments thereof, it will be understood by those skilled in the art that the foregoing and other changes in form and detail may be made therein without departing from the spirit and scope of the invention. The appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the appended claims may contain the introductory phrases "at least one" or "one or more" to introduce claim elements. However, the use of such phrases should not be construed to imply that the introduction of a claim element by indefinite articles such as "a" or "an" limits any particular claim containing such introduced claim element to inventions containing only one such element, even when the same claim includes the introductory phrases "at least one" or "one or more" and indefinite articles such as "a" or "an"; the same holds true for the use in the claims of definite articles.

We claim:

1. A method, in an information handling system comprising a processor and a storage device, for improving the handling of personally identifiable information, said method comprising:

generating, in the information handling system, an object model for representing relationships between active entities with regard to handling of personally identifiable information, wherein the active entities comprise a data subject, represented as a data subject object in the object model, and at least one data user, represented as at least one data user object in the object model, and wherein the data subject is an active entity that is identified by the personally identifiable information and the at least one data user is an active entity that uses the personally identifiable information obtained from the data subject;

identifying, by the information handling system, parties involved in a process of handling personally identifiable information based on the object model, wherein the parties comprise the data subject and the at least one data user;

identifying, by the information handling system, data involved in said process from a data model;

classifying, by the information handling system, the data as personally identifiable information or non-personally identifiable information;

expressing, by the information handling system, based on the object model, each relationship between each pair of said parties in terms of a privacy agreement, wherein the privacy agreement for each relationship between each pair of parties is a subset of a natural language privacy policy set, the subset being defined as specific to a particular situation or purpose and specific to the particular parties in the pair of parties; and representing, by the information handling system, said parties, said data, and said privacy agreements graphically as objects and associations between objects in one or more privacy agreement relationship diagrams;

reducing privacy-related risks involved in said process based on the one or more privacy agreement relationship diagrams; and transforming data into a less sensitive form based on the one or more privacy agreement relationship diagrams, wherein the less sensitive form is one of a de-personalized form in which transformed data does not contain personally identifiable information that identifies the data subject but is able to be associated with the data subject using other data having personally identifiable information, or an anonymous form in which transformed data does not contain personally identifiable information that identifiers the data subject and is not able to be associated with the data subject, wherein:

each privacy agreement uses a limited number of privacy-related actions concerning said personally identifiable information; and said privacy agreement expresses privacy rules regarding said privacy-related actions, for each party in a pair of parties with which the privacy agreement is associated.

2. The method of claim 1, further comprising mapping a business process to privacy rules of one or more privacy agreements for each pair of parties.

3. A system for improving the handling of personally identifiable information, said system comprising:
- a processor; and
- a memory coupled to the processor, wherein the memory comprises instructions which, when executed by the processor, cause the processor to:
- generate an object model for representing relationships between active entities with regard to handling of personally identifiable information, wherein the active entities comprise a data subject, represented as a data subject object in the object model, and at least one data user, represented as at least one data user object in the object model, and wherein the data subject is an active entity that is identified by the personally identifiable information and the at least one data user is an active entity that uses the personally identifiable information obtained from the data subject;
- identify parties involved in a process of handling personally identifiable information based on the object model, wherein the parties comprise the data subject and the at least one data user;
- identify data involved in said process from a data model;
- classify the data as personally identifiable information or non-personally identifiable information
- express, based on the object model, each relationship between each pair of said parties in terms of a privacy agreement, wherein the privacy agreement for each relationship between each pair of parties is a subset of a natural language privacy policy set, the subset being defined as specific to a particular situation or purpose and specific to the particular parties in the pair of parties;
- represent said parties, said data, and said privacy agreements graphically as objects and associations between objects in one or more privacy agreement relationship diagrams;
- reduce privacy-related risks involved in said process based on the one or more privacy agreement relationship diagrams; and
- transform data into a less sensitive form based on the one or more privacy agreement relationship diagrams, wherein the less sensitive form is one of a de-personalized form in which transformed data does not contain personally identifiable information that identifies the data subject but is able to be associated with the data subject using other data having personally identifiable information, or an anonymous form in which transformed data does not contain personally identifiable information that identifiers the data subject and is not able to be associated with the data subject, wherein:
- each privacy agreement uses a limited number of privacy-related actions concerning said personally identifiable information; and
- said privacy agreement expresses privacy rules regarding said privacy-related actions, for each party in a pair of parties with which the privacy agreement is associated.

4. The system of claim 3, wherein the instructions further cause the processor to map a business process to privacy rules of one or more privacy agreements for each pair of parties.

5. A computer-usable medium having computer-executable instructions for improving the handling of personally identifiable information, said computer-executable instructions, when executed by a computing device, cause the computing device to:
- generate an object model for representing relationships between active entities with regard to handling of personally identifiable information, wherein the active entities comprise a data subject, represented as a data subject object in the object model, and at least one data user, represented as at least one data user object in the object model, and wherein the data subject is an active entity that is identified by the personally identifiable information and the at least one data user is an active entity that uses the personally identifiable information obtained from the data subject;
- identify parties involved in a process of handling personally identifiable information based on the object model, wherein the parties comprise the data subject and the at least one data user;
- identify data involved in said process from a data model;
- classify the data as personally identifiable information or non-personally identifiable information;
- express, based on the object model, each relationship between each pair of said parties in terms of a privacy agreement, wherein the privacy agreement for each relationship between each pair of parties is a subset of a natural language privacy policy set, the subset being defined as specific to a particular situation or purpose and specific to the particular parties in the pair of parties; and
- represent said parties, said data, and said privacy agreements graphically as objects and associations between objects in one or more privacy agreement relationship diagrams;
- reduce privacy-related risks involved in said process based on the one or more privacy agreement relationship diagrams; and
- transform data into a less sensitive form based on the one or more privacy agreement relationship diagrams, wherein the less sensitive form is one of a de-personalized form in which transformed data does not contain personally identifiable information that identifies the data subject but is able to be associated with the data subject using other data having personally identifiable information, or an anonymous form in which transformed data does not contain personally identifiable information that identifiers the data subject and is not able to be associated with the data subject, wherein:
- each privacy agreement uses a limited number of privacy-related actions concerning said personally identifiable information; and
- said privacy agreement expresses privacy rules regarding said privacy-related actions, for each party in a pair of parties with which the privacy agreement is associated.

6. The computer-useable medium of claim 5, wherein the instructions further cause the computing device to map a business process to privacy rules of one or more privacy agreements for each pair of parties.

* * * * *

UNITED STATES PATENT AND TRADEMARK OFFICE
CERTIFICATE OF CORRECTION

PATENT NO. : 7,603,317 B2  Page 1 of 1
APPLICATION NO. : 09/884296
DATED : October 13, 2009
INVENTOR(S) : Adler et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2032 days.

Signed and Sealed this

Fifth Day of October, 2010

David J. Kappos
*Director of the United States Patent and Trademark Office*